United States Patent [19]

Herold et al.

[11] Patent Number: 5,303,227
[45] Date of Patent: Apr. 12, 1994

[54] METHOD AND APPARATUS FOR ENHANCED MODES IN SPI COMMUNICATION

[75] Inventors: Barry W. Herold; Joan S. DeLuca, both of Boca Raton, Fla.

[73] Assignee: Motorola, Inc., Schaumburg, Ill.

[21] Appl. No.: 923,774

[22] Filed: Aug. 3, 1992

[51] Int. Cl.⁵ .......................... H04L 5/14; G06F 3/00
[52] U.S. Cl. ...................................... 370/24; 395/275
[58] Field of Search ....................... 370/24, 29, 30, 31, 370/32, 92; 340/825.52, 825.07; 395/275

[56] References Cited

U.S. PATENT DOCUMENTS

| | | | |
|---|---|---|---|
| 3,967,058 | 6/1976 | Moriya et al. | 370/29 |
| 4,075,427 | 2/1978 | Mattsson et al. | 370/24 |
| 4,739,323 | 4/1988 | Miesterfeld et al. | 340/825.5 |
| 4,739,324 | 4/1988 | Miesterfeld et al. | 340/825.5 |
| 4,742,349 | 5/1988 | Miesterfeld et al. | 340/825.5 |
| 4,763,323 | 8/1988 | Nelson et al. | 340/825.5 |
| 4,779,093 | 10/1988 | Watkins | 340/825.57 |
| 4,803,481 | 2/1989 | Mueller et al. | 340/825.5 |
| 4,816,996 | 3/1989 | Hill et al. | 395/275 |
| 4,823,312 | 4/1989 | Michael et al. | 364/900 |
| 4,831,358 | 5/1989 | Ferrio et al. | 304/825.5 |
| 4,958,277 | 9/1990 | Hill et al. | 395/275 |

OTHER PUBLICATIONS

Motorola technical publication "8-Bit Microcomputers", pp. 6-1 through 6-12, published 1985 by Motorola, Inc.

Primary Examiner—Douglas W. Olms
Assistant Examiner—Hassan Kizou
Attorney, Agent, or Firm—Kelly A. Gardner; Thomas G. Berry; Daniel R. Collopy

[57] ABSTRACT

A method for full duplex data transference between a master device and a slave device comprises the steps of the slave device providing (725) data stored in a location within the slave device to the master device and the master device providing (760) modified data to be stored in the location to the slave device. A further step includes the slave device, substantially coincident with the master device providing (760) the modified data to the slave device, providing (755) data stored in a subsequent location within the slave device to the master device.

17 Claims, 10 Drawing Sheets

METHOD AND APPARATUS FOR ENHANCED MODES IN SPI COMMUNICATION

FIELD OF THE INVENTION

This invention relates in general to communication between semiconductor devices, and more specifically to a method and apparatus for full duplex communication between a master device and a slave device.

BACKGROUND OF THE INVENTION

Electronic devices, such as pagers, often incorporate communication between different semiconductor devices. In many electronic devices, the communication between semiconductor components involves data transference between a master device, which controls the communication process, and a slave device, which responds to commands from the master device. In this manner, the tasks necessary to the operation of the electronic device may be shared by the master device and the slave device, thereby providing for the faster execution of the necessary tasks.

In conventional pagers, a microcomputer, employed as a master device, may be interactively coupled to one or more slave devices, e.g., a support chip or another microcomputer, to perform such operations as decoding incoming messages and monitoring internal pager parameters, e.g., battery voltage. During normal operation of the pager, the master device typically communicates with a slave device to either read or modify information stored within registers internal to the slave device.

The microcomputer in a pager may, for example, read the contents of a register to determine whether a message has been received by the pager. In response to reception of a message, the microcomputer may provide modified information to the slave device directing it to transmit a signal to an alert mechanism, whereby an audible or tactile alert is generated.

In many cases, communication between the microcomputer and the slave device must be completed very rapidly, as when messages are being decoded. If the communication cannot be completed within a predetermined amount of time at a normal rate of data transfer, the microcomputer increases the rate of transfer to ensure the completion of the communication between the devices. For example, in many conventional pagers, a predetermined amount of time exists in which the pager is able to recover a message included in a selective call signal. If the message is not completely recovered within this predetermined amount of time, the message could be erroneously decoded or possibly be lost entirely by the pager. In one conventional pager, depending upon factors such as type or length of message, decoding the message could require from 138 to 416 operations involving data transference between the microcomputer and the slave device. In each case, the microcomputer internal to the pager will adjust the rate of transfer to complete the required operations within the predetermined amount of time. However, increasing the speed at which data is transferred requires a higher consumption of current by the microcomputer, thereby decreasing the life of a battery providing power to the pager. From a user standpoint, any decrease in the battery life of the pager is very undesirable.

Thus, what is needed is a rapid method of data transference between semiconductor devices that does not increase the power consumption of the pager.

SUMMARY OF THE INVENTION

According to a first aspect of this invention, a method for full duplex data transference between a master device and a slave device comprises the steps of the slave device providing data stored in a location within the slave device to the master device and the master device providing modified data to be stored in the location to the slave device. A further step includes the slave device, substantially coincident with the master device providing the modified data to the slave device, providing data stored in a subsequent location within the slave device to the master device.

According to a second aspect of this invention, an electronic device having full duplex data transference between semiconductor devices comprises a master device, a slave device, which includes a memory for storing information, and a communication channel for data communication between the master device and the slave device. The communication channel comprises a data transference channel for providing data transference between the master device and the slave device such that the slave device provides data stored in a location within the slave device to the master device and a full duplex communication channel for providing full duplex communication between the master device and the slave device such that, in response to reception of the data stored in the location, the master device provides modified data to be stored in the location to the slave device substantially coincident with the slave device providing data stored in a next location to the master device.

DESCRIPTION OF A PREFERRED EMBODIMENT

Figure 1:
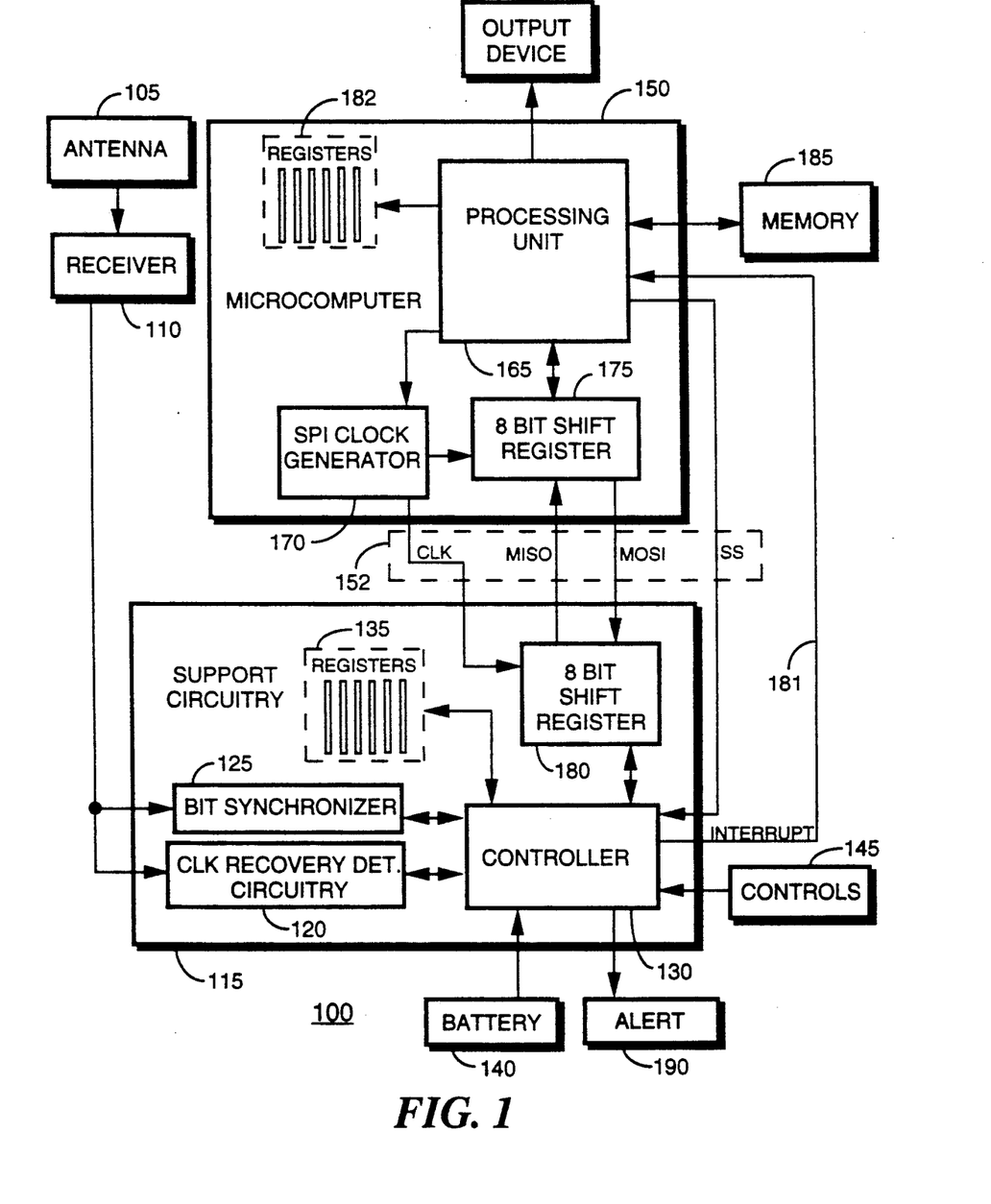
FIG. 1 is a block diagram of a selective call receiver having a master device and a slave device in accordance with a preferred embodiment of the present invention.

Referring to FIG. 1, a selective call receiver 100, e.g., a pager, comprises an antenna 105 that receives a radio frequency (RF) selective call signal transmitted by a selective call transmitter. A receiver 110 demodulates the selective call signal, subsequent to which support circuitry 115 samples the demodulated signal to recover a selective call message contained therein. The support circuitry 115 includes clock recovery determination circuitry 120 for detecting the baud rate of the demodulated signal and a bit synchronizer 125 for maintaining synchronization to the demodulated signal. A controller 130, further included in the support circuitry 115, stores data recovered from the demodulated signal in storage registers 135 located within the support circuitry 115. Additionally, the controller 130 may further receive signals from user actuated controls 145 located on the exterior of the pager and monitor pager operational parameters, such as voltage of a battery 140 providing primary power to the pager. Information about the operational parameters and the signals received from the user actuated controls 145 is stored as data in the registers 135.

A microcomputer 150 is coupled to and communicates with the support circuitry 115. In accordance with a preferred embodiment of the present invention, the microcomputer 150, which controls communication, and the support circuitry 115, which decodes the selective call message, have the relationship of a master device and a slave device, respectively, and are coupled by a serial peripheral interface (SPI) 152. The SPI 152 includes four interconnections between the microcomputer 150 and the support circuitry 115. A slave select (SS) line, by which the microcomputer 150 initiates communication with the support circuitry 115, is coupled between the support circuitry 115 and a processing unit 165 internal to the microcomputer 150. When the SS line is taken low to initiate communication, the microcomputer processing unit 165 further directs an SPI clock generator 170 to begin generation of a clock signal by which data transference is synchronized. Four possible timing relationships, controlled by the microcomputer 150, exist between the clock signal and the transferred data. The clock signal, having one of the four possible timing relationships with transferred data, is transferred over a clock line coupled between the clock generator 170 and 8 bit shift registers 175, 180 located in the microcomputer 150 and the support circuitry 115. When communication is initiated by the microcomputer processing unit 165, data is moved into the 8 bit shift registers 175, 180 for subsequent transfer. Data provided to the support circuitry 115 from the microcomputer 150 is shifted, in synchronization with the clock signal, across a master out slave in (MOSI) line, while data provided to the microcomputer 150 from the support circuitry 115 is shifted, in synchronization with the clock signal, across a master in slave out (MISO) line.

During normal decoding, in accordance with the preferred embodiment of the present invention, the support circuitry 115 pulls an interrupt line 181, coupled between the controller 130 and the microcomputer processing unit 165, low to indicate that data has been recovered from the demodulated signal. In response to the interrupt line 181 being pulled low, the microcomputer processing unit 165 takes the SS line low to initiate communication with the support circuitry 115, subsequent to which the recovered data is moved from the storage registers 135 into the 8 bit shift register 180 located in the support circuitry 115. In synchronization with the clock signal, the recovered data is shifted across the MISO line into the 8 bit shift register 175 located in the microcomputer 150. The recovered data is thereafter temporarily stored by the microcomputer processing unit 165 in storage registers 182 located within the microcomputer 150. The microcomputer processing unit 165 then compares an address included in the data to a pager address stored in a pager memory 185. If the address included in the data is equivalent to the pager address, indicating that a message for the pager is included in the data, the message is stored in the pager memory 185. Upon reception of a message for the pager, the microcomputer processing unit 165 initiates communication with the support circuitry 115 and generates an instruction signal, transferred across the MOSI line, directing the controller 130 to provide a signal to an alert mechanism 190. In response to reception of the signal generated by the controller 130, the alert mechanism 190 provides an alert, such as an audible tone, to a user to announce reception of a message. If the user desires to be presented with the message, he manipulates the user actuated controls 145, which generate a user initiated signal received by the controller 130. The controller 130 stores information about the user initiated signal in the registers 135 and pulls the interrupt line 181 low to inform the microcomputer processing unit 165 that data is ready to be transferred. Subsequently, the microcomputer processing unit 165 takes the SS line low to initiate communication. The information about the user initiated signal generated by the controls 145 is thereafter moved from the registers 135 to the 8 bit shift register 180 located within the support circuitry 115. In synchronization with the clock signal, the information is transferred, via the MISO line, to the microcomputer 150, in response to which the message is retrieved from the pager memory 185 and provided to an output device 195, such as an audio speaker or a liquid crystal display (LCD), for presentation thereby.

Additionally, the support circuitry 115 monitors operational parameters, such as battery voltage. For example, if the voltage of the battery 140 drops below a predetermined threshold, the controller 130 pulls the interrupt line 181 low, in response to which the microcomputer processing unit 165 takes the SS line low to initiate communication. Information about the battery voltage is thereafter transferred from the support circuitry 115 to the microcomputer 150 in the manner described above. In response to receiving the information from the support circuitry 115, the microcomputer 150 responds, perhaps after further communication with the support circuitry 115, to the received information.

Figure 2:
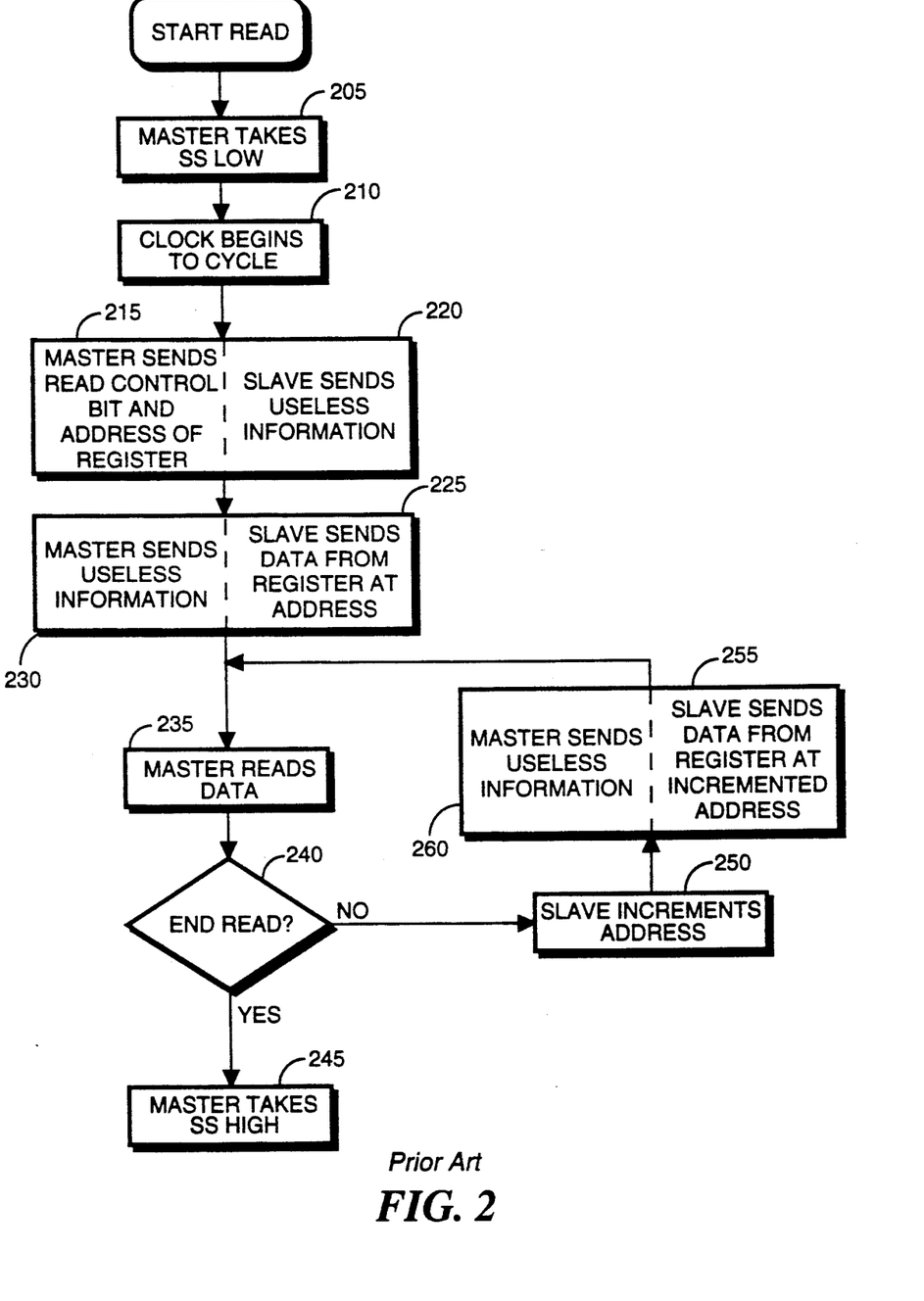
FIG. 2 is a flowchart depicting a conventional method of data transference between the master device and the slave device of FIG. 1, wherein data stored in the slave device may be accessed by the master device.

Conventionally, data transference between a master device and a slave device occurs in either a "read" mode or a "write" mode, as determined by the master device. FIG. 2 is a flowchart illustrating a conventional method of transferring data in the "read" mode, wherein the master device accesses data stored within the slave device. To initiate communication with the slave device, the master device takes the SS line low 205, subsequent to which the clock generator 170 (FIG. 1) begins to generate 210 a clock signal provided to the 8 bit shift registers 175, 180. According to the present invention, on a first falling edge of the clock, the master device sends 215, across the MOSI line, a control byte of data comprising a "read" control bit, indicating to the slave device that data will be read by the master device during the data transfer. The control byte transferred by the master device further comprises an address of one of the storage registers 135 located within the slave device. Simultaneously with the master device transferring 215 the control byte, the slave device transmits 220 a byte of data across the MISO line. This simultaneous transmission is in accordance with full duplex data transmission, wherein both data into and data out of the master device are synchronized to the same clock signal provided by the clock generator 170.

Because the slave device has not yet received the control byte during this first data transfer, the byte transferred 220 by the slave device consists of information that has been previously loaded into the 8 bit shift register 180, i.e., useless information. In response to receiving the control byte, the slave device controller 130 (FIG. 1) retrieves data stored in the addressed register and loads it into the 8 bit shift register 180 for transmission 225 to the master device across the MISO line. Simultaneously with the slave device transmitting 225 the data included in the addressed register, the master device, in accordance with full duplex data transference, transmits 230 a byte of useless information to the slave device across the MOSI line. The master device thereafter reads 235 the data supplied by the slave device. If the master device has accessed all of the necessary data, the read operation is ended 240 when the master device takes 245 the SS line high, thereby terminating communication with the slave device.

If the master device does not end 240 the read operation, the slave device increments 250 the address included in the control byte and retrieves data stored in a register indicated by the incremented address. The data is thereafter loaded into the 8 bit shift register 180 and transmitted 255 across the MISO line. Simultaneously with this transmission, the master device sends 260 another byte of useless information to the slave device. The master device again reads 235 the data received from the slave device and decides 240 whether to terminate communication with the slave device by taking 245 the SS line high. If the master device does not end 240 the read operation, the slave continues to increment 250 the address and transmit 255 further data to the master device. In this manner, the master device is able to continuously access data stored in the slave device. The read operation, however, allows data to be transmitted in one direction only, such that, after transmission 215 of the control byte, the master device transfers 230, 260 only bytes of useless information.

Figure 3:
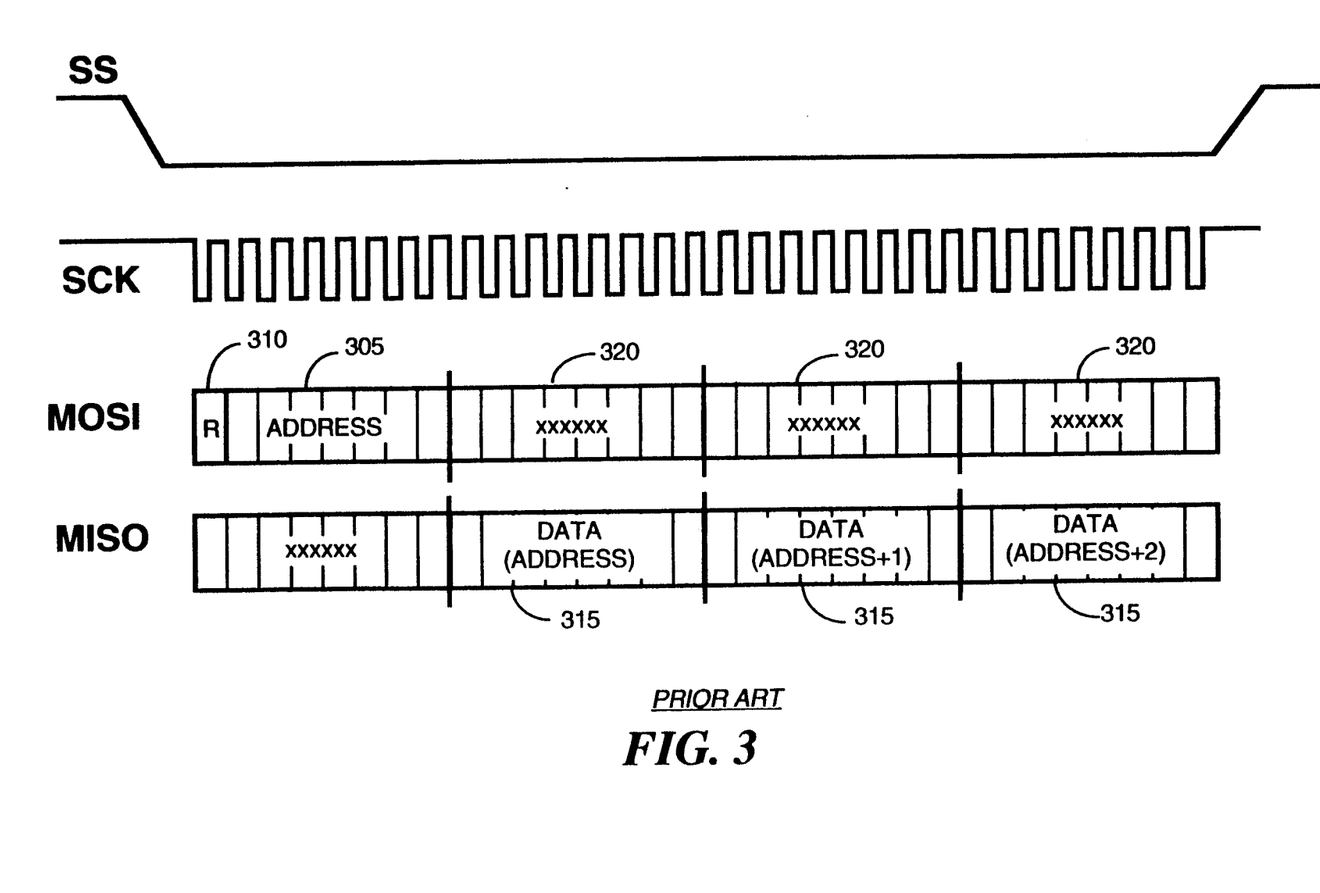
FIG. 3 is a timing diagram illustrating the conventional method of data transference of FIG. 2, wherein data stored in the slave device may be accessed by the master device.

The conventional read operation of FIG. 2 may be better illustrated by referring to FIG. 3, which depicts a timing diagram of the conventional read operation. As described in FIG. 2, the master device transfers 215 the control byte 305, including the read control bit 310 and the address of a location within the slave device, on the first data transfer. Thereafter, simultaneously with the slave device transmitting 225, 255 (FIG. 2) each byte of data 315 across the MISO line, the master device transmits 230, 260 (FIG. 2) a byte of useless information 320 across the MOSI line. The slave continues to send further data until the master device takes the SS line high 245 (FIG. 2).

Figure 4:
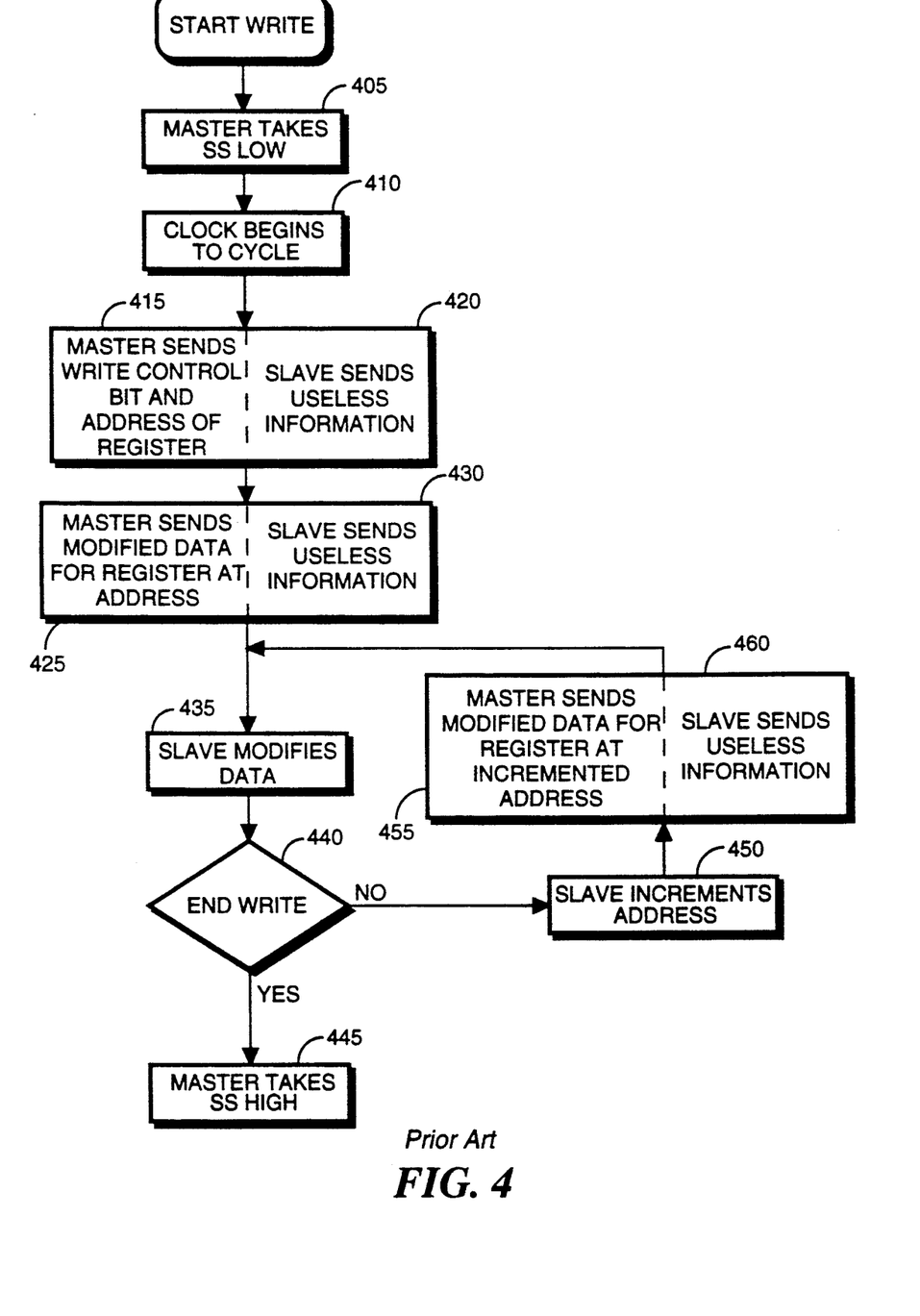
FIG. 4 is a flowchart depicting a conventional method of data transference between the master device and the slave device of FIG. 1, wherein data stored in the slave device may be modified by the master device.

Referring next to FIG. 4, a flowchart illustrates a conventional method of data transfer in the "write" mode, wherein the master device modifies data stored in the slave device. The master device initiates communication by taking 405 the SS line low and enables generation 410 of the clock signal by the clock generator 170 (FIG. 1). At a first falling edge of the clock, the master device transfers 415, across the MOSI line, a control byte comprising a "write" control bit, which indicates to the slave device the master device will modify data during the data transfer. The control byte further comprises an . address of a storage register located within the slave device. In accordance with full duplex data transference, simultaneously with the master device providing 415 the control byte, the slave device transfers 420 a byte of useless information across the MISO line. Subsequent to transmission 415 of the control byte, the master device transfers 425, via the MOSI line, modified data that is to be stored in the addressed register simultaneously with the slave device transferring 430 a further byte of useless information across the MISO line. This modified data may, for example, comprise data, which was previously received from the slave device, that has been modified by the master device. Alternatively, the modified data may include information received from another source, such as another semiconductor device or a programming port, or simply data which has been generated by the master device that is to be stored in, i.e., "written" to, the slave device. In any case, the modified data refers to any data provided to the slave device from the master device.

In response to reception of the modified data, the slave device replaces 435 the data stored in the addressed register with the modified data provided by the master device. If no further registers are to be modified, the master device ends 440 the write operation by taking 445 the SS line high. If further registers are to be modified, the slave device increments 450 the address included in the control byte. The master device thereafter transfers 455, via the MOSI line, further modified data for a register located at the incremented address simultaneously with the slave device sending 460 a byte of useless information across the MISO line. In response to reception of the modified data, the slave device replaces 435 the data stored in the register located at the incremented address with the modified data. The transmission of additional modified data continues in this manner until the master device ends 440 the write operation by taking 445 the SS line high to terminate communication with the slave device.

Figure 5:
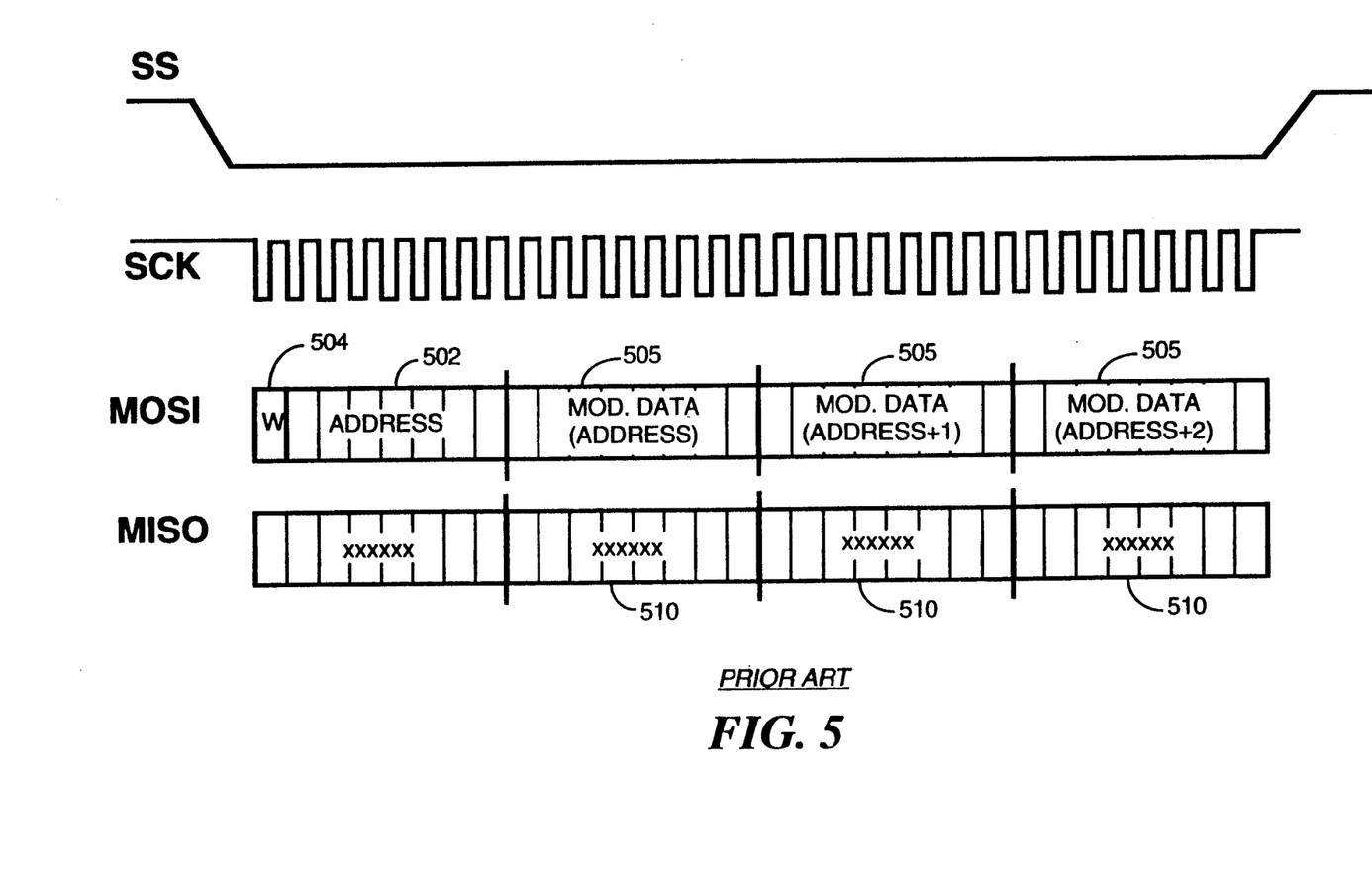
FIG. 5 is a timing diagram illustrating the conventional method of data transference of FIG. 4, wherein data stored in the slave device may be modified by the master device.

The timing diagram depicted in FIG. 5 further illustrates the conventional write operation described in FIG. 4. As shown in FIG. 5, the master device transfers 415 (FIG. 4) the control byte 502, which includes the write control bit 504. Thereafter, simultaneously with the master device sending 425, 455 (FIG. 4) each modified byte of data 505 across the MOSI line, the slave device sends 430, 460 (FIG. 4) a byte of useless information 510. This pattern is repeated until the master device terminates the write operation by taking 445 the SS line high. In this manner, the master device is able to continuously provide modified data to the slave device. This write operation, however, allows data to be transmitted in one direction only, such that the slave device transfers only bytes of useless information 510.

While the conventional read and the write operations allow the master device to access and modify data stored in the slave device, such operations may become time consuming and cumbersome under some circumstances. For example, the master device may, while reading data stored in storage registers 135 (FIG. 1) located within the slave device, encounter data that needs to be modified. In such a case, shown in the timing diagram of FIG. 6, the master device must perform a series of unwieldy steps to modify the data. First, the master device must initiate 205 (FIG. 2) communication with the slave device and, by sending 215 a control byte 305 to the slave device, set the SPI 152 (FIG. 1) in the read mode. After receiving the desired data 315 from the slave device, the data 315 is temporarily stored in the storage registers 182 (FIG. 1) internal to the master device, subsequent to which the master device ends communication in the read mode by taking 245 the SS line high. The master device thereafter initiates 405 (FIG. 4) further communication with the slave device and transfers 415 a control byte 502 to set the SPI 152 in the write mode and to indicate an address where modified data is to be stored. Subsequent to modifying the data that is the master device moves the modified data into the 8 bit shift register 175 (FIG. 1), from which it is transferred 425 (FIG. 4) as a byte 505 of modified data to the slave device in synchronization with the clock signal. In response to receiving the modified data, the slave device stores 435 (FIG. 4) the modified data in the addressed register and, if no further registers are to be modified, the master device ends 440 the write operation by taking 445 the SS line high. If the master device desires to read further data stored in the slave device, the read operation must be reinitiated.

Figure 6:
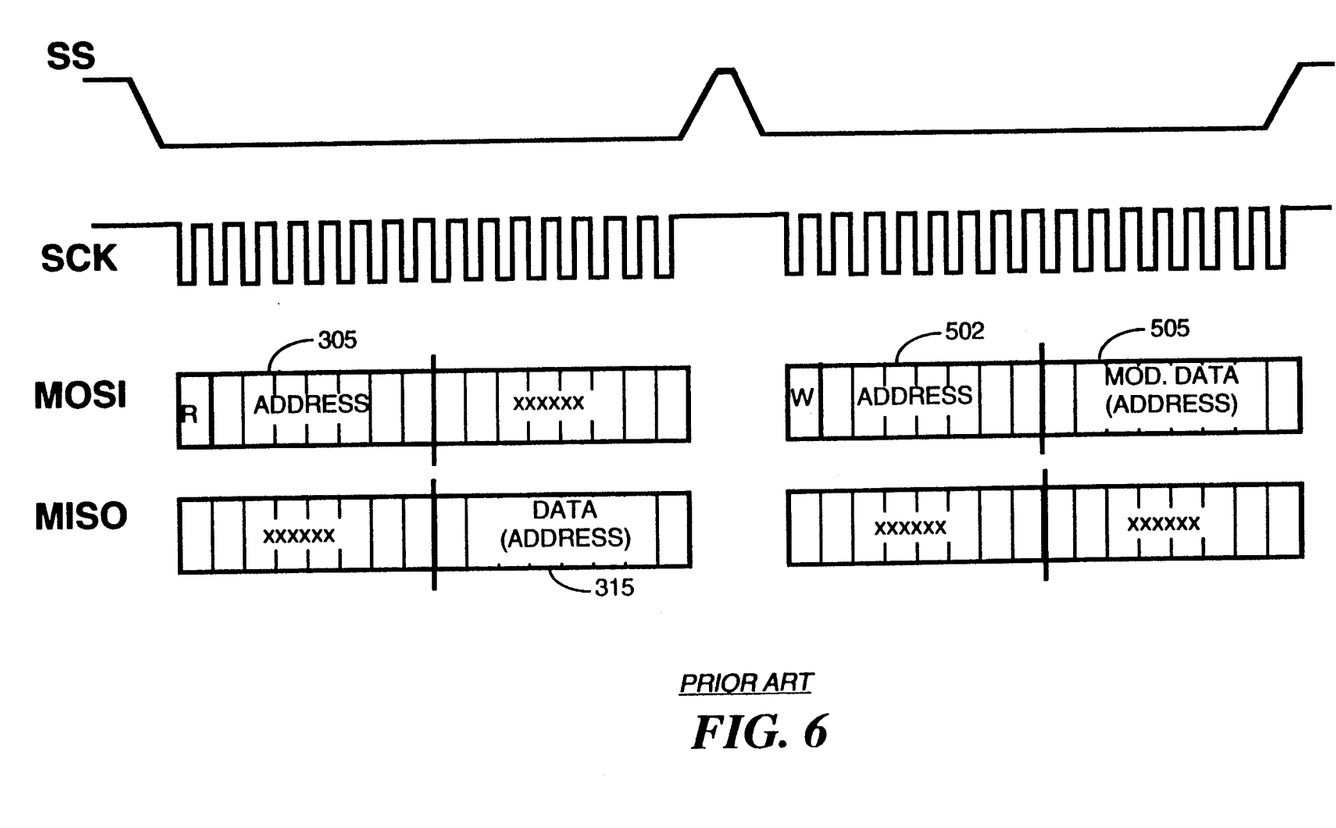
FIG. 6 is a timing diagram illustrating the combination of the conventional methods of data transference depicted in FIGS. 3 and 5, wherein data stored in the slave device may be accessed and subsequently modified by the master device.

The operation as shown in FIG. 6 requires at least four data transfers in which data is transferred simultaneously across the MISO and MOSI lines in accordance with full duplex data communication. In addition to the four data transfers, this operation requires that the master device end communication in the read mode, then reinitiate communication in the write mode. This method can be time consuming, although, as mentioned above, the master device may, in conventional pagers, increase the speed at which the data is transferred to meet the needs of the system. This increase in speed, however, requires greater current consumption by the pager, thereby decreasing the battery life.

Figure 7:
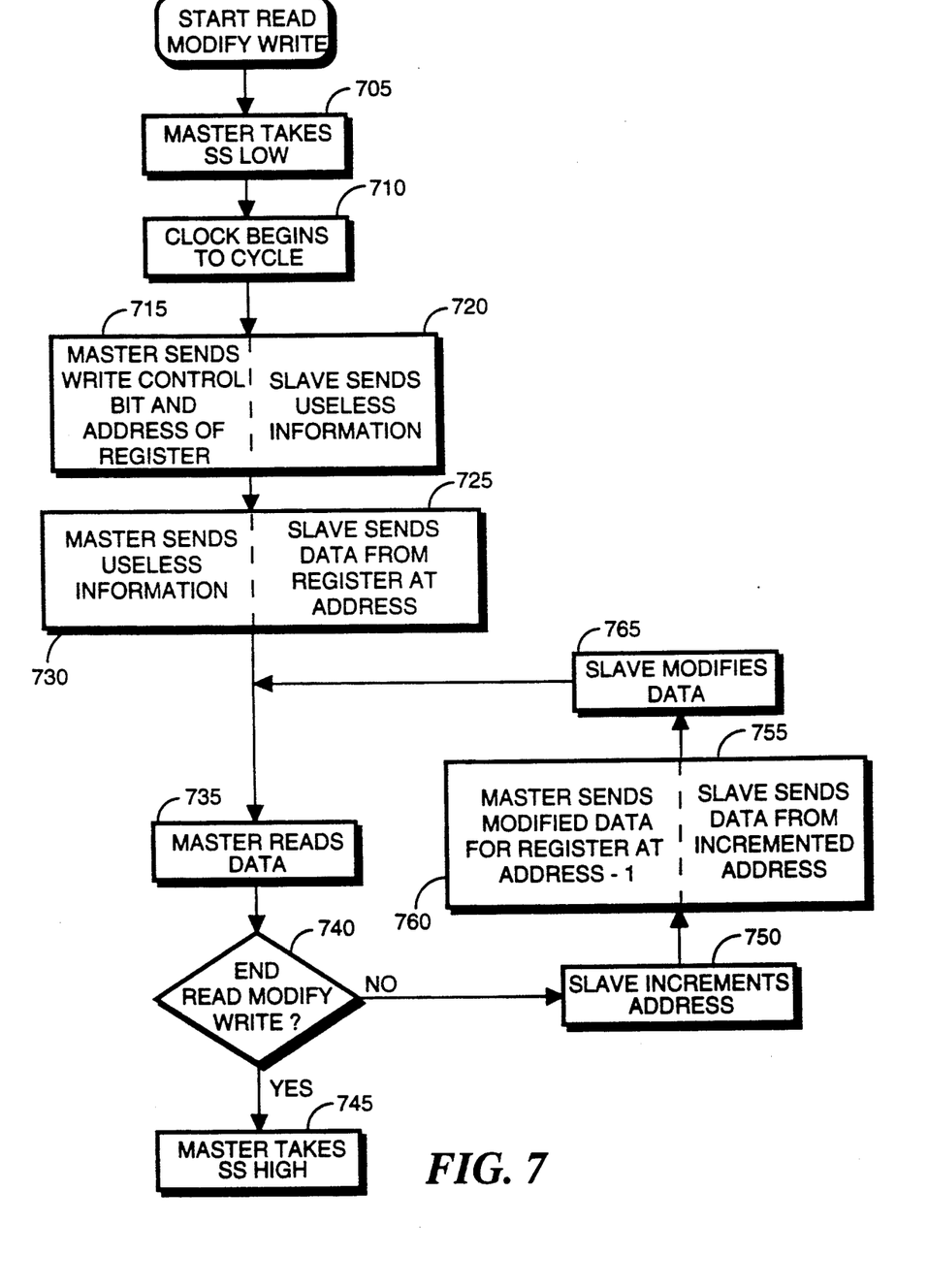
FIG. 7 is a flowchart depicting a method of data transference between the master device and the slave device of FIG. 1, wherein data stored in the slave device may be accessed and subsequently modified by the master device in accordance with the preferred embodiment of the present invention.

·Referring to FIG. 7, a flowchart depicts a "read modify write" method, in accordance with the preferred embodiment of the present invention. The "read modify write" operation, by which the steps described in FIG. 6 may be more rapidly performed, preferably replaces the conventional "write" operation when specified by the master device. Initially, the master device takes 705 the SS line low and enables the generation 710 of the clock signal by the clock generator 170 (FIG. 1). Preferably, at a first falling edge of the clock signal, the master device transfers 715, via the MOSI line, a control byte, containing a "write" control bit and an address indicating a register located within the slave device, simultaneously with the slave device transferring 720 a byte of useless information across the MISO line. Subsequent to reception of the control byte, the slave device transfers 725 data contained in the addressed register to the master device. Simultaneously with this transmission 725, the master device transfers 730 a byte of useless information to the slave device. The master device thereafter reads 735 the data received from the slave device while the data is contained in the 8 bit shift register 175 (FIG. 1).

If the master device then chooses to end 740 the "read modify write" operation, the SS line high is taken high 745. If the master device continues the "read modify write" operation, the slave device increments 750 the address provided in the control byte. Subsequently, the slave device transfers 755, via the MISO line, data stored in the register indicated by the incremented address. The master device simultaneously transfers 760, via the MOSI line, modified data to be stored in the previous address, i.e., the address provided in the control byte. In accordance with the preferred embodiment of the present invention, the master device is able to read 735 the received data while the SPI 152 (FIG. 1) is set in the write mode, whereas, conventionally, the master device could read data only in the read mode. As a result, the data received from the slave device may be modified by the master device while it is contained in the 8 bit shift register 175 (FIG. 1) internal to the master device then simply shifted 760 across the MOSI line at the next data transfer, thereby eliminating the need to temporarily store the data in the storage registers 182 located within the master device. Alternatively, if the master device prefers not to modify the received data, the received data is transferred 760 across the MOSI line at the next data transfer and processed by the slave device as if it were modified data. In response to reception of the modified data, the slave device stores 765 the modified data in the register indicated by the previous address, i.e., the address prior to the incremented address. This cycle is continued until the master device ends 740 the "read modify write" operation by taking 745 the SS line high, thereby terminating communication with the slave device.

Figure 8:
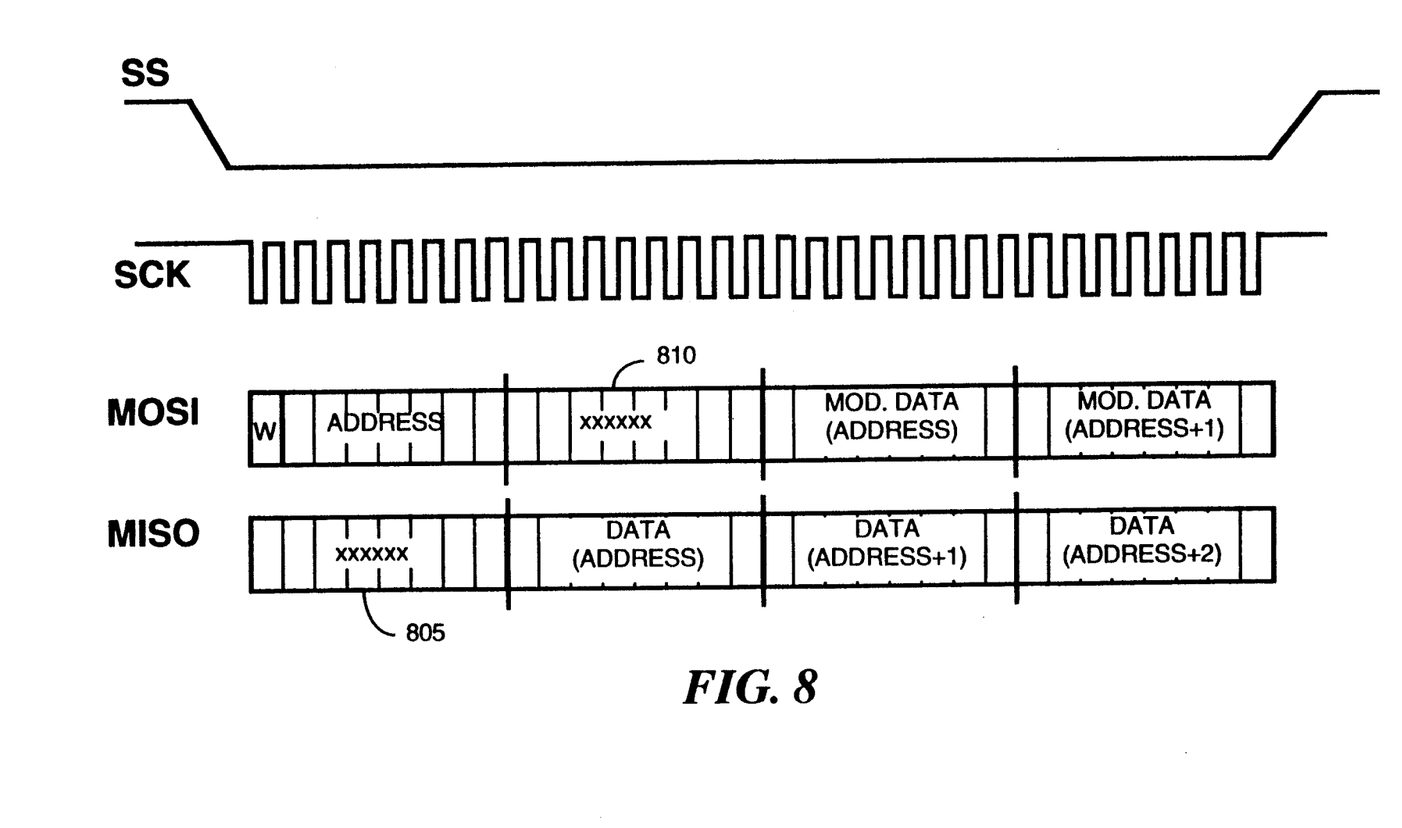
FIG. 8 is a timing diagram illustrating the method of data transference of FIG. 7, wherein data stored in the slave device may be accessed and subsequently modified by the master device in accordance with the preferred embodiment.

Referring next to FIG. 8, a timing diagram illustrates the "read modify write" operation described in FIG. 7. In accordance with the preferred embodiment of the present invention, only two bytes of useless information 805, 810 are transferred across the MOSI and MISO lines, whereas, in the conventional method depicted in FIG. 6, at least four bytes of useless information are transferred. Furthermore, the "read modify write" operation depicted in FIG. 8 does not require the master device to perform the additional steps of ending communication in the read mode and reinitiating communication in the write mode, as shown in FIG. 6.

Figure 9:
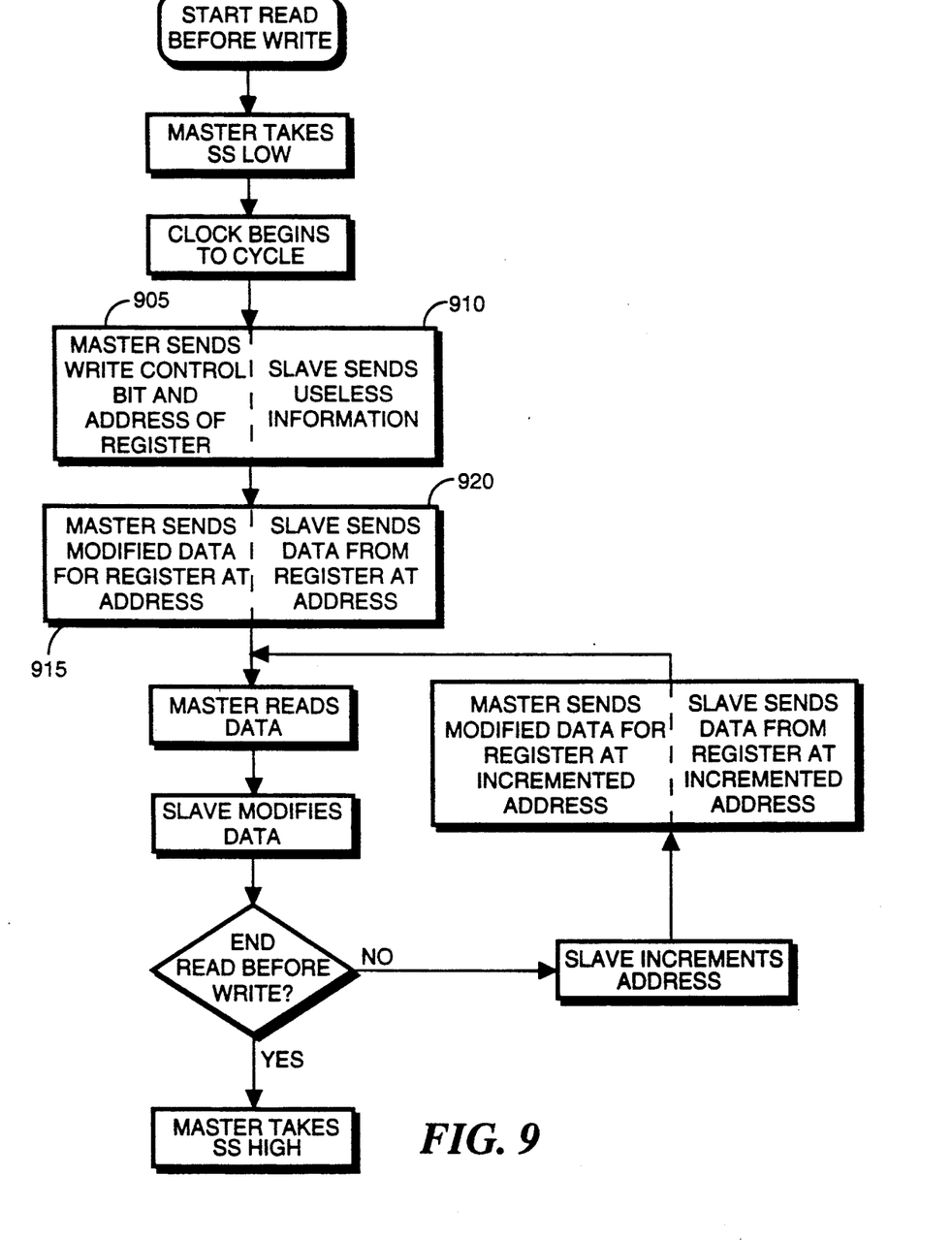
FIG. 9 is a flowchart depicting a method of data transference between the master device and the slave device of FIG. 1, wherein data stored in the slave device may be accessed as it is modified by the master device in accordance with an alternate embodiment of the present invention.
Figure 10:
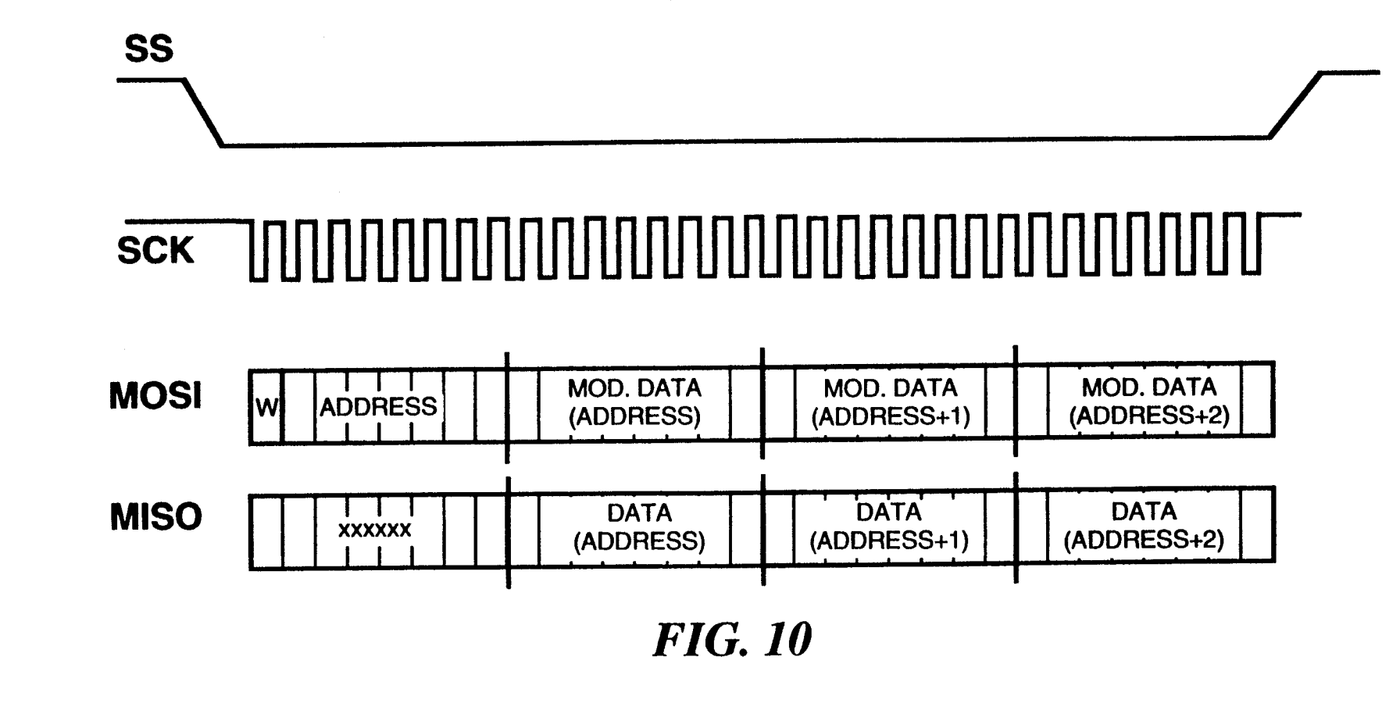
FIG. 10 is a timing diagram illustrating the method of data transference of FIG. 9, wherein data stored in the slave device may be accessed as it is modified by the master device in accordance with the alternate embodiment of the present invention.

In an alternate embodiment of the present invention, the SPI 152 (FIG. 1) may be set in a "read before write" mode, which replaces the conventional "write" mode, as depicted in FIGS. 9 and 10. Referring to FIG. 9, subsequent to initiating communication, the master device transfers 905 a control byte, containing a "write" control bit and an address. The slave device simultaneously transfers 910 a byte of useless information across the MISO line. Thereafter, at the next data transfer, the master device sends 915 modified data to be stored in the addressed register simultaneously with the slave device sending 920 data currently stored in the addressed register. In this manner, the master device may advantageously read any "read only" bits, such as status bits, while continuing to provide modified data to the slave device. As described above, the modified data comprises any data that is provided to the slave device from the master device.

In conventional pagers, if status bits need to be accessed, the master device is forced to terminate communication in the write mode and reinitiate communication in the read mode in order to read the status bits. This conventional method requires at least four data transfers. The minimum of four data transfers includes two data transfers, in which the SPI 152 (FIG. 1) is set in the read mode and the master device, while modifying data, encounters a read only bit, and two further data transfers, in which the SPI 152 is set in a read mode and the master device reads the read only bit of concern which has been provided by the slave device.

In summary, the conventional method of reading data stored in a slave device prior to modifying the data could become time consuming and unwieldy. The master device was forced to store data received from the slave device in internal storage registers during the read mode, then retrieve the data from the register to modify the data during the write mode. This operation required the transference of no fewer than four bytes of useless information, as shown in FIG. 6. Additionally, the master device was required to end communication with the slave device in the read mode and subsequently reinitiate communication with the slave device in the write mode. Conversely, the use of the "read modify write" operation in accordance with the preferred embodiment of the present invention advantageously allows the master device to read and modify data received from the slave device while the SPI is set in the write mode. This operation, shown in FIG. 8, requires as little as three data transfers to accomplish the same task described in FIG. 6. As can be seen by referring to the timing diagrams of FIGS. 6 and 8, the "read modify write" operation in accordance with the preferred embodiment of the present invention not only reduces the number of data transfers required, but also eliminates the steps of terminating and reinitiating communication in a different mode. The master device, therefore, is able to access and modify data faster without increasing the rate of data transfer. Furthermore, the data received from the slave device may be both read and modified while contained in the 8 bit shift register, thereby disposing of the need for temporary storage registers, other than the 8 bit shift register, internal to the master device.

By now it should be appreciated that there has been provided a rapid method of data transference between a master device and a slave device that does not increase the power consumption of the pager.

What is claimed is:

1. A method for full duplex data transference between a master device and a slave device, comprising the steps of:
   (a) the slave device providing a first amount of data stored in a location within the slave device to the master device, wherein the location is associated with a first address previously provided to the slave device by the master device;
   (b) the master device providing to the slave device modified data to be stored in the location associated with the first address previously provided to the slave device by the master device; and
   (c) the slave device, substantially coincident with step (b), automatically providing a second amount of data stored in a subsequent location within the slave device to the master device, wherein the subsequent location is associated with a second address generated by incrementing the first address.

2. The method in accordance with claim 1, further comprising the step of:
   (d) the master device providing a communication termination signal to the slave device when no further data is to be modified.

3. The method in accordance with claim 1, further comprising the step of:
   (e) prior to step (a), the master device providing a control signal to the slave device, wherein the control signal comprises control information and the first address indicating the location within the slave device.

4. The method in accordance with claim 3, further comprising the step of:
   (g) (f) prior to step (e), the master device providing a communication initiation signal to the slave device.

5. A method for full duplex data transference between a master device and a slave device, comprising the steps of:
   (a) the master device providing a communication initiation signal to the slave device;
   (b) the master device providing a control signal to the salve device, wherein the control signal comprises control information and an address indicating a location within the slave device;
   (c) the slave device, in response to step (b), providing data stored in the location within the slave device to the master device;
   (d) the slave device automatically incrementing the address to indicate a subsequent location within the slave device;
   (e) the master device providing modified data to be stored in the location to the slave device;
   (f) the slave device, substantially coincident with step (e), providing data stored in the subsequent location; and
   (g) the master device providing a communication termination signal to the slave device when no further data is to be modified.

6. A method for full duplex data transference between a master device and a slave device, comprising the steps of:
   (a) the slave device providing data stored in a location within the slave device to the master device, wherein the location is associated with a first address previously provided to the slave device by the master device;
   (b) the master device substantially coincident with step (a), providing modified data to be stored in the location to the slave device;
   (c) the master device, subsequent to step (b), providing a communication termination signal to the slave device when no further data is to be written to the slave device;
   (d) the slave device incrementing the first address provided by the master device when the communication termination signal is not received;
   (e) the slave device, subsequent to step (d), providing data stored in a subsequent location to the master device, wherein the subsequent location is associated with a second address generated by incrementing the first address; and (f) the master device, substantially coincident with step (e), providing to the slave device modified data to be stored in the subsequent location.

7. The method in accordance with claim 6, further comprising the step of:

(g) prior to step (a), the master device providing a control signal to the slave device, wherein the control signal comprises control information and the first address indicating the location within the slave device.

8. The method in accordance with claim 7, further comprising the step of:

(g) (h) prior to step (c), the slave device automatically incrementing the address to indicate the subsequent location.

9. A method for full duplex data transference between a master device and a slave device, comprising the steps of:

(a) the master device providing a communication initiation signal to the slave device;

(b) the master device providing a control signal to the slave device, wherein the control signal comprises control information and an address indicating a location within the slave device;

(c) the slave device, in response to step (b), providing data that is stored in the location within the slave device to the master device;

(d) the master device, substantially coincident with step (c), providing modified data to be stored in the location to the slave device;

(e) the slave device automatically incrementing the address to indicate a subsequent location within the slave device;

(f) the slave device providing data that is stored in the subsequent location to the master device when the data stored in the subsequent location is to be modified;

(g) the master device, substantially coincident with step (f), providing modified data to be stored in the subsequent location to the slave device when the data stored in the subsequent location is to be modified; and (h) the master device providing a communication termination signal to the slave device when no further data is to be modified.

10. An electronic device having full duplex data transference between semiconductor devices, comprising:

a master device;
a slave device, comprising:
storing means for storing information; and
communication means for data communication between the master device and the slave device, comprising:
means for providing data transference between the master device and the slave device such that the slave device provides data stored in a location within the slave device to the master device, wherein the location is associated with a first address previously proved to the slave device by the master device; and
means for providing full duplex communication between the master device and the slave device such that, in response to reception of the data stored in the location, the master device provides modified data to be stored in the location to the slave device substantially coincident with the slave device providing data stored in a next location within the slave device to the master device, wherein the next location is indicated by a second address generated by incrementing the first address.

11. The electronic device in accordance with claim 10, wherein the communication means further comprises:

means for providing a control signal from the master device to the slave device prior to the salve device providing the data stored in the location to the master device, the control signal comprising control information and the first address indicating the location within the slave device, and wherein the means for providing data transference between the master device and the slave device is activated in response to reception of the control signal by the slave device.

12. The electronic device in accordance with claim 11, wherein the communication means further comprises:

means for providing a communication initiation signal from the master device to the slave device prior to the master device providing the control signal to the slave device; and means for providing a communication termination signal from the master device to the slave device when no further data is to be modified.

13. An electronic device having full duplex data transference between semiconductor devices, comprising:

a master device;
a slave device, comprising:
a memory for storing information; and
a communication channel for data communication between the master device and the slave device such that the slave device provides data stored in a location within the slave device to the master device, in response to which the mater device provides modified data to be stored in the location to the slave device substantially coincident with the slave device providing data stored in a next location to the master device, wherein the location is associated with a first address previously provided to the slave device by the master device, and the next location is associated with a second address generated by incrementing the first address.

14. An electronic device having full duplex data transference between semiconductor devices, comprising:

a master device;
a slave device, comprising:
storing means for storing information; and
communication means for data communication between the master device and the slave device, comprising:
means for providing full duplex communication between the master device and the slave device such that the slave device provides data stored in a location within the slave device to the master device substantially coincident with the master device providing modified data to be stored in the location to the slave device, wherein the location is associated with an address previously provided to the slave device by the master device.

15. The electronic device in accordance with claim 14, wherein the communication means further comprises means for providing a control signal from the master device to the slave device, wherein the control signal comprises control information and the address indicating the location within the slave device.

16. The electronic device in accordance with claim 15, wherein the communication means further comprises:
   means for providing a communication initiation signal from the master device to the slave device prior to the master device providing the control signal to the slave device; and
   means for providing a communication termination signal from the master device to the slave device when no further data is to be modified.

17. An electronic device having full duplex data transference between semiconductor device, comprising:
   a master device;
   a slave device comprising
      a memory for storing information; and
      a full duplex communication channel for providing full duplex communication between the master device and the slave device such that the slave device provides data stored in a location within the slave device to the master device substantially coincident with the master device providing modified data to be stored in the location, wherein the location is associated with an address previously provided to the slave device from the master device.

* * * * *

UNITED STATES PATENT AND TRADEMARK OFFICE
CERTIFICATE OF CORRECTION

PATENT NO.  : 5,303,227
DATED       : April 12, 1994
INVENTOR(S) : Herold, et al.

It is certified that error appears in the above-indentified patent and that said Letters Patent is hereby corrected as shown below:

In claim 4, column 10, line 24, delete "(g)".

In claim 8, column 11, line 16, delete "(g)".

In claim 13, column 12, line 41, change "mater" to --master--.

Signed and Sealed this

Tenth Day of October, 1995

Attest:

BRUCE LEHMAN

Attesting Officer

Commissioner of Patents and Trademarks